United States Patent
Tyagi et al.

(10) Patent No.: US 11,003,847 B1
(45) Date of Patent: May 11, 2021

(54) SMART DYNAMIC COLUMN SIZING

(71) Applicant: SAP SE, Walldorf (DE)

(72) Inventors: Harish Tyagi, Saratoga, CA (US);
Lukas Maximilian Brand, San Mateo, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/674,262

(22) Filed: Nov. 5, 2019

(51) Int. Cl.
*G06F 17/00* (2019.01)
*G06F 40/18* (2020.01)
*G06F 40/103* (2020.01)

(52) U.S. Cl.
CPC ............ *G06F 40/18* (2020.01); *G06F 40/103* (2020.01)

(58) Field of Classification Search
None
See application file for complete search history.

(56) References Cited

U.S. PATENT DOCUMENTS

| | | | | | |
|---|---|---|---|---|---|
| 5,588,099 | A * | 12/1996 | Mogilevsky | .............. | G06T 3/40 715/273 |
| 5,790,118 | A * | 8/1998 | Bertram | ................ | G06F 1/1626 715/744 |
| 6,044,383 | A * | 3/2000 | Suzuki | .................. | G06F 40/177 715/236 |
| 6,256,650 | B1 * | 7/2001 | Cedar | ..................... | G06F 40/10 715/235 |
| 6,639,611 | B1 * | 10/2003 | Leduc | ................... | G06F 40/177 715/764 |
| 10,152,460 | B2 * | 12/2018 | Kennedy, Jr. | ......... | G06F 40/177 |
| 2002/0013165 | A1 * | 1/2002 | Ostergaard | ............ | G06F 3/0481 455/566 |
| 2003/0028560 | A1 * | 2/2003 | Kudrolli | ................. | G06F 40/18 715/273 |
| 2005/0097444 | A1 * | 5/2005 | Ivarsey | ............... | G06F 16/9577 715/255 |
| 2006/0195784 | A1 * | 8/2006 | Koivisto | ............ | G06F 16/9577 715/234 |
| 2007/0028161 | A1 * | 2/2007 | Haugh | .................. | G06F 40/103 715/210 |
| 2007/0136654 | A1 * | 6/2007 | Peters | ..................... | G06F 40/18 715/217 |
| 2007/0136655 | A1 * | 6/2007 | Peters | ................... | G06F 40/177 715/217 |
| 2009/0138817 | A1 * | 5/2009 | Oron | ................... | G06F 16/9577 715/788 |
| 2009/0281976 | A1 * | 11/2009 | Liu | ..................... | G06F 16/9577 706/47 |

(Continued)

OTHER PUBLICATIONS

Dalvi, "Microsoft Excel: Splitting One Cell Row into Multiple Rows", dated Nov. 29, 2013, pp. 1-5, URL:<https://www.techrecipes.com/rx/45005/microsoft-excel-splitting-one-cell-row-into-multiple-rows/> (Year: 2013).*

*Primary Examiner* — Mustafa A Amin
(74) *Attorney, Agent, or Firm* — Schwegman Lundberg & Woessner, P.A.

(57) ABSTRACT

In an example embodiment, a process is introduced and acted upon a table prior to the rendering of the table. This process involves optimizing the display of the table by, among other things, automatically setting column widths to reduce extra white space, removing columns with no data, and/or generally reducing the size of the table to attempt to, if possible, remove the presence of a horizontal scroll bar.

20 Claims, 8 Drawing Sheets

(56) References Cited

U.S. PATENT DOCUMENTS

| | | | | |
|---|---|---|---|---|
| 2011/0107196 A1* | 5/2011 | Foster | ............... | G06F 40/177 |
| | | | | 715/227 |
| 2011/0276868 A1* | 11/2011 | Hoke | ............... | G06F 40/18 |
| | | | | 715/217 |
| 2014/0280139 A1* | 9/2014 | Hade | ............... | G06F 16/219 |
| | | | | 707/737 |
| 2014/0280831 A1* | 9/2014 | Gao | ............... | H04L 41/22 |
| | | | | 709/223 |
| 2015/0135052 A1* | 5/2015 | Thompson | ............ | G06F 40/177 |
| | | | | 715/227 |
| 2015/0347370 A1* | 12/2015 | Villani | ............... | G06F 40/177 |
| | | | | 715/227 |
| 2016/0224316 A1* | 8/2016 | Mitchell | ............... | G06F 40/166 |
| 2016/0306778 A1* | 10/2016 | Kennedy, Jr. | ......... | G06F 40/177 |
| 2017/0329749 A1* | 11/2017 | Milward | ............... | G06F 16/86 |

* cited by examiner

BEFORE

| 🏢 Addresses (4) | | | | | | | ↑↓ |
|---|---|---|---|---|---|---|---|
| Address | | Mobile | E-Mail | Main | Bill-To | Ship-To | |
| 3500 Lenox Read / T... | | | | No | No | No | |
| 3500 Lenox Read / T... | | | | No | No | No | |
| 3500 Lenox Read / T... | | | | No | No | No | |
| 3500 Lenox Read / T... | | | | Yes | Yes (Aut | Yes (Auto | |
| | | | | | | K < 1 /1 > >| | |

*Figure 4A*

AFTER

| 🏢 Addresses (4) | | | | | | ↑↓ |
|---|---|---|---|---|---|---|
| Address | Phone | Mobile | E-Mail | Main | Bill-To | Ship-To |
| 3500 Lenox Read / T12, Atlanta, GA | | | | No | No | No |
| 3500 Lenox Read / T12, Atlanta, GA | | | | No | No | No |
| 3500 Lenox Read / T12, Atlanta, GA | | | | No | No | No |
| 3500 Lenox Read / T12, Atlanta, GA | | | | Yes | Yes (Auto) | Yes (Auto) |
| | | | | | K < 1 /1 > >| | |

*Figure 4B*

BEFORE

| | Addresses (4) | | | | | | | ↑↓ |
|---|---|---|---|---|---|---|---|---|
| 504A | Address | | Phone | Mobile | Fax | E-Mail | Main | Bill-To |
| | 3500 Lenox Read / T12, Atlanta ... | | 504B | | | | No | No |
| 504C | 3500 Lenox Read / T12, Atlanta ... | | | | | | No | No |
| | 3500 Lenox Read / T12, Atlanta ... | | 504D | | | | No | No |
| | 3500 Lenox Read / T12, Atlanta ... | | | | | | Yes | Yes (A |
| | | | | | | | |⟨ ⟨ 1 /1 ⟩ ⟩|

AFTER

| | Addresses (4) | | | | | | | ↑↓ |
|---|---|---|---|---|---|---|---|---|
| 504A | Address | | Phone | Mobile | Fax | E-Mail | Main | Bill-To | Ship-To |
| | 3500 Lenox Read / T12, Atlanta, GA | 504B | | | | No | No | No |
| 504C | 3500 Lenox Read / T12, Atlanta, GA | | | | | No | No | No |
| | 3500 Lenox Read / T12, Atlanta, GA | 504D | | | | No | No | No |
| | 3500 Lenox Read / T12, Atlanta, GA | | | | | Yes | Yes (Auto) | Yes (Auto) |
| | | | | | | | ⟨ ⟨ 1 /1 ⟩ ⟩ |

BEFORE

| | Products (2) | | | | | 🔲 ⬅➡ | 🗐 Add Quick Add ... More |
|---|---|---|---|---|---|---|---|
| ☐ | Line ▲ | Product Category | Product ID | Description | Net Price | | Quantity |
| ☐ | 10 | 5 - Smartphone | P500100 | SmarTouch 4G Smartphone 16... | | | |
| ☐ | 20 | 130 - Software | MDECC-DS01 | MDECC-DS01 | | | |
| ■ 1 Selected | | | | | | | ⫷ ⟨ 1 /1 ⟩ ⫸ |

*Figure 6A*

AFTER

| | Products (2) | | | | | | 🔲 ⬅➡ | 🗐 Add Quick Add ... More | | | |
|---|---|---|---|---|---|---|---|---|---|---|---|
| ☐ | Line | Product Category ▲ | Product ID | Description | Net Price | Quan-tity | Request Date | External Product ID | In-cote | Action | Deliver Priority | Multipl UoM |
| ☐ | 10 | 5 - Smartphone | P500100 | SmarTouch 4G Smartphone 16GB | 4 ea | | 2019-02 | | NY | | Normal | + |
| ☐ | 20 | 130 - Software | MDECC... | MDECC-DS01 | 5 ea | | 2019-02 | MDECC | NY | | Normal | + |
| ■ 1 Selected | | | | | | | | | | | ⫷ ⟨ 1 /1 ⟩ ⫸ |

*Figure 6B*

SMART DYNAMIC COLUMN SIZING

TECHNICAL FIELD

This document generally relates to systems and methods for use in user interfaces displayed on computer systems. More specifically, this document relates to smart dynamic column sizing for table-based user interfaces.

BACKGROUND

Various different types of computer applications display data in user interfaces in the form of tables, namely by displaying data in cells of columns and rows. Spreadsheet applications, for example, lay out a spreadsheet using such columns and rows, and indeed many database retrievals and data analysis applications utilize a similar column and row based presentation of data.

From a visual standpoint, it is usually considered more visually pleasing to present such tables using rows of equal height (i.e., no variance in height from row to row), but to allow for variation on column width to accommodate the user needs and the data itself. Traditionally, however, such variation was controlled by the end-user, who could, for example, click a marker indicating a vertical border of a column and drag it left or right to increase or decrease the width of the column. This customization would then be preserved upon future views of the same table.

While this was a satisfactory solution for a number of years, in more recent times users have begun utilizing more than one type of computer system to view data, such as using a desktop computer at work, a laptop computer at home, and a mobile device (or multiple mobile devices), conceivably all being used to view the same table at different times. This is problematic because each of these devices has a different screen size and resolution. This creates the technical problem of the user's selection of a column width on one device causing a visually unpleasing layout on another device. Additionally, even within the same device, the rise of mobile devices have also increased the likelihood that the same device could be easily swapped between different viewing modes, the most common being switching between portrait and landscape mode. The result is that a user's selection of a column width in portrait mode may cause a visually unpleasing layout when the user switches to landscape mode, and vice-versa.

What is needed is a technical solution that optimizes the view of a table no matter the device or viewing mode used.

BRIEF DESCRIPTION OF DRAWINGS

The present disclosure is illustrated by way of example and not limitation in the figures of the accompanying drawings, in which like references indicate similar elements.

FIGS. 4A-4B are screen captures illustrating the dynamic adjustment of a table by removal of a column.

FIG. 5A-5B are screen captures illustrating the dynamic adjustment of a table by reducing the width of some columns while increasing the width of other columns, in accordance with an example embodiment.

FIG. 6A-6B are screen captures illustrating the dynamic adjustment of a table by reducing the width of some columns and wrapping header text, in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a process in introduced and acted upon a table prior to the rendering of the table. This process involves optimizing the display of the table by, among other things, automatically setting column widths to reduce extra white space, removing columns with no data, and/or generally reducing the size of the table to attempt to, if possible, remove the presence of a horizontal scroll bar.

Figure 1:
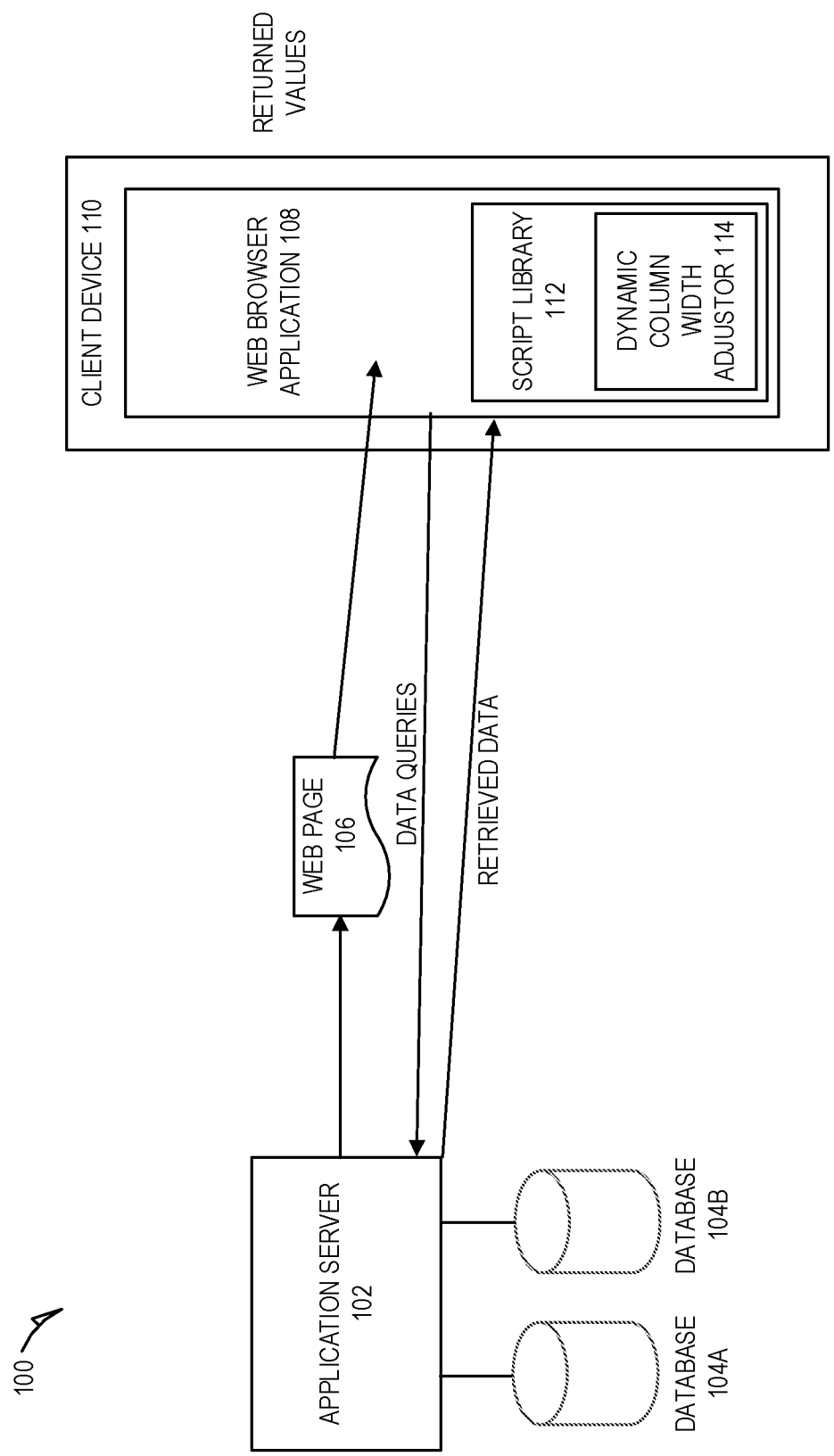
FIG. 1 is a block diagram illustrating a system for smart column resizing in accordance with an example embodiment.

FIG. 1 is a block diagram illustrating a system 100 for smart column resizing in accordance with an example embodiment. FIG. 1 depicts the system 100 in the context of a browser-based embodiment. System 100 may include an application server 102 that is coupled to one or more databases 104A, 104B. The application server 102 may serve a web page 106 to a web browser application 108 operated on a client device 110. The web browser application 108 runs the web page 106, which generally provides a user interface on which a user of the client device 110 can specify one or more data queries (either implicitly or explicitly). These data queries are then passed to the application server 102, which may then use the data queries to retrieve data relevant to the data queries from the one or more databases 104A, 104B. This retrieved data can then be passed to the web browser application 108 for display in the user interface.

In an example embodiment, the web browser application 108 includes a script library 112. In one example embodiment, the script library 112 contains scripts written in a scripting language, such as Javascript. In an example embodiment, one or more of these scripts represent a dynamic column width adjustor 114 that, when executed, dynamically adjusts various elements of a table to be rendered by the web browser application 108 to make the table more visually pleasing to the user. The one or more scripts representing the dynamic column width adjustor 114 may be called by elements of the web page 106 when the web page 106 is run by the web browser application 108. More particularly, these one or more scripts may be called subsequent to the retrieved data being received from the application server 102 but prior to the rendering of the retrieved data in the user interface. Timing the adjustment of the various elements of the table to be performed prior to the rendering of the retrieved data helps avoid the visually unpleasing scenario where the retrieved data is initially rendered in a first layout until being quickly adjusted to a second layout, which can give the user the perception of the "snapping" or movement of data on the display.

While FIG. 1 depicts the dynamic column width adjustor 114 being implemented in the web browser application 108, in other embodiments the dynamic column width adjustor 114 can be located elsewhere, such as on the application server 102, or on another server. Indeed, in one example embodiment, the dynamic column width adjustor 114 can be implemented in the form of a web worker, which is a script that runs in the background, independently of other scripts, without affecting the performance of the page, and even can be distributed to other computing devices.

Figure 2:
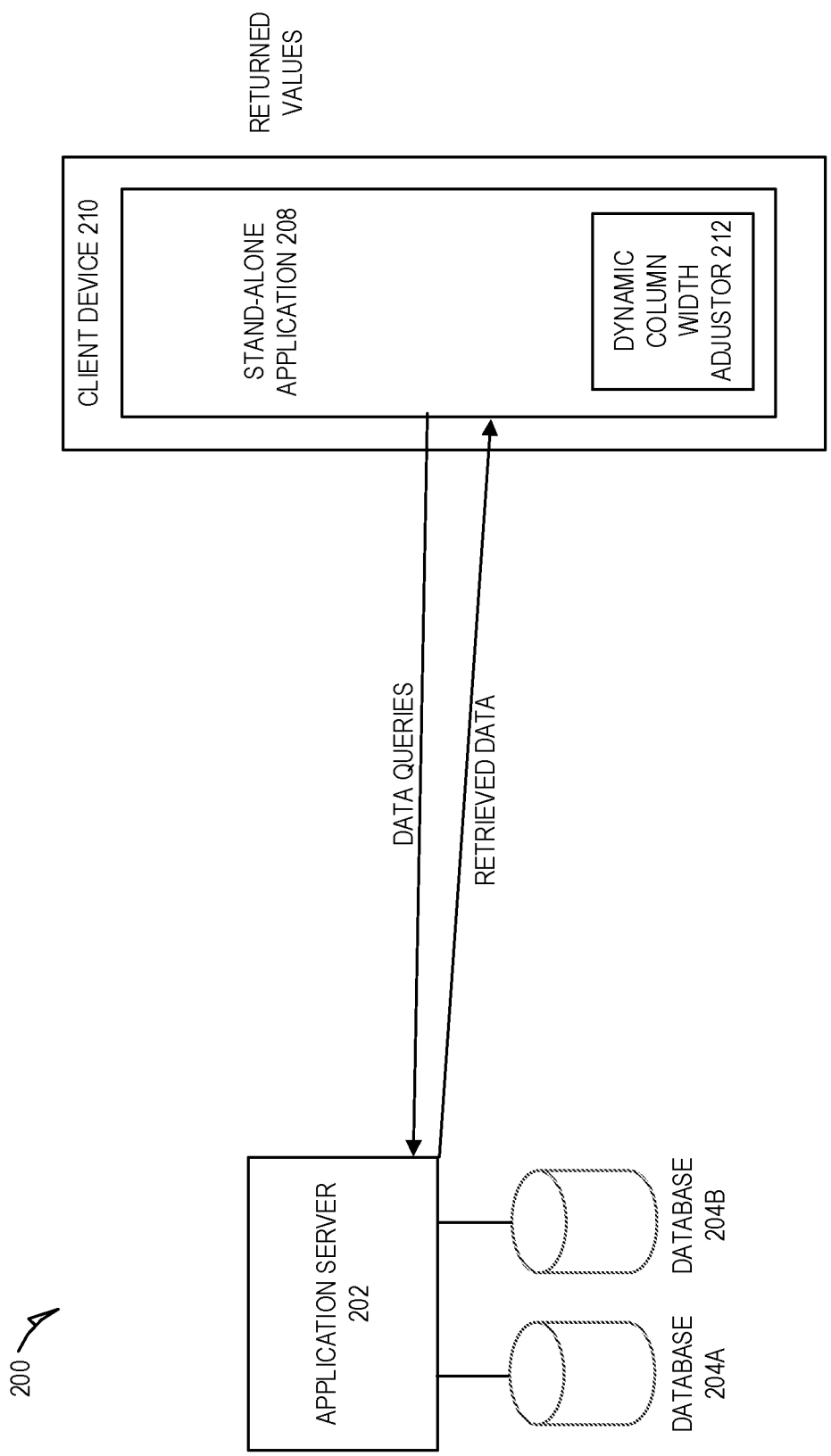
FIG. 2 is a block diagram illustrating a system for smart column resizing in accordance with an example embodiment.

FIG. 2 is a block diagram illustrating a system 200 for smart column resizing in accordance with an example embodiment. FIG. 2 depicts the system 200 in the context of a dedicated stand-alone application-based embodiment. System 200 may include an application server 202 that is coupled to one or more databases 204A, 204B. The application server 202 may serve instructions to a stand-alone application 208 operated on a client device 210. The stand-alone application 208 provides a user interface on which a user of the client device 210 can specify one or more data queries (either implicitly or explicitly). These data queries are then passed to the application server 202, which may then use the data queries to retrieve data relevant to the data queries from the one or more databases 204A, 204B. This retrieved data can then be passed to the stand-alone application 208 for display in the user interface.

In an example embodiment, the stand-alone application 208 includes dynamic column width adjustor 212 that, when executed, dynamically adjusts various elements of a table to be rendered by the stand-alone application 208 to make the table more visually pleasing to the user. The dynamic column width adjustor 212 may be run subsequent to the retrieved data being received from the application server 202 but prior to the rendering of the retrieved data in the user interface.

Figure 3:
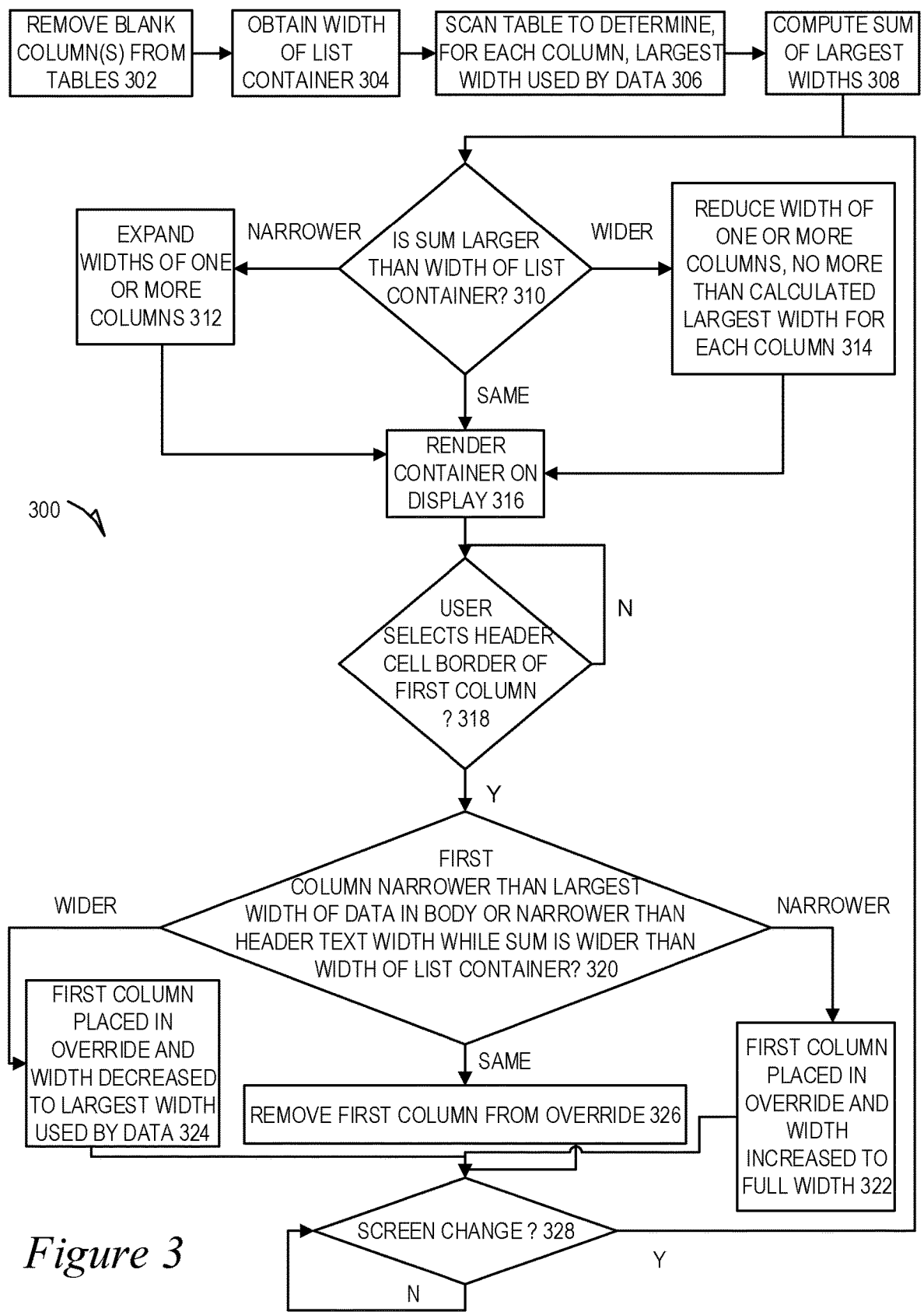
FIG. 3 is a flow diagram illustrating a method of dynamically adjusting a table in accordance with an example embodiment.

In either embodiment, the dynamic column width adjustor 114 or 212 runs a series of processes to make the table more visually pleasing to the user. FIG. 3 is a flow diagram illustrating a method 300 of dynamically adjusting a table in accordance with an example embodiment. It should be noted that while this method 300 is described as dynamically adjusting a table, in an example embodiment, as described above, this adjustment is performed prior to the table being rendered on the display. This may be viewed as performing the adjustment to the underlying parameters that will be used to render the table, but for purposes of this application the phrase "adjusting the table" shall be interpreted to also cover the adjustment of the underlying parameters that will be used to render the table.

At operation 302, any blank column is removed from the table. Again, this may also be viewed as adjusting the underlying parameters of the table to ensure that the blank column is not displayed when rendered (as well as removing the column from consideration in future operations). A series of operations are then performed to attempt to adjust the table so that no horizontal scroll bar is needed to view all of the columns of the table.

At operation 304, a width of a list container is obtained. A list container is an object that defines, among other things, the boundaries of a window to be rendered in a user interface. There may, for example, be multiple list containers on a screen, with each list container defining the boundaries of a different table of data to be rendered. Thus, the width of the list container essentially tells the system the available width of space where a particular table is to be rendered. In some example embodiments, other types of objects may be used for similar purposes, or even in extreme cases a resolution of a window or even resolution of a screen display is used.

It should be noted that Cascade Style Sheets (CSS) allows for simple media break points based on screen width, but this is not sufficient to solve the technical problems solved by the solution in the present disclosure. Rather, in an example embodiment, the container width is propagated through all the nested children inside a flex layout.

It should also be noted that inherent in the container width is an indication of the viewing mode of the display (portrait or landscape), as the width of the container will change if the user rotates the display (in devices that support such rotation, at least).

At operation 306, the table is scanned to determine, for each column, the largest width used by any data in the column. For example, in the simple case where the data has three rows, and a particular column has data in the first row of size 12 characters, data in the second row of size 14 characters, and data in the third row of size 6 characters, the largest number of characters used for any data in that column would be 14 characters. It should be noted that while characters are described in this example, in implementation the width might be expressed in terms of pixel width, which allows for columns with data that is not text based, such as those containing images.

At operation 308, a sum of all the largest widths of all the columns is computed. It should be noted that in some example embodiments this sum could be padded with some predefined minimum amount of pixels between columns (to allow for visual spacing to separate the columns). At operation 310, this sum is compared to the width of the container in which the table is intended to be rendered (obtained in operation 304). If the sum is less than or equal to the width of the container, then there is no need to render a horizontal scroll bar and in fact at operation 312 the columns may be expanded beyond the initial width set earlier to make the columns take up substantially or completely the entire available width of the display (without the need to render a horizontal scroll bar). In one example embodiment, the columns are allowed to grow equally based on their current relative distribution.

If the sum is greater than the width of the display, then operations are performed to attempt to reduce the size of the table to fit without the need to render a horizontal scroll bar. At operation 314, width of both the header and the body cells are reduced for each column to attempt to fit all the columns in the container without the need for a horizontal scroll bar. This reduction of the width of the header and the body cells for a column is capped, for each column, at the calculated largest width of data in the cells. In other words, the width of both the header and the body of each column cannot be made to be any narrower than the widest data in the column. This has the effect of removing extraneous white space in, as many of the columns as possible. In another example embodiment, this technique is only applied for columns that do not have a width override associated with them. Specifically, in some example embodiments, certain columns may not be set at the width of the largest data in the column. For example, if the user has explicitly specified a width for the column, or a developer has explicitly specified a width for the column, then this explicitly specified width might be used may essentially override any attempts to reduce the width of that column at operation 314. It should be noted that this override may apply in many different types of cases, in that a user or developer could manually set a column width to be either wider than the widest data in the body of the column or possibly narrower than the widest data in the body of the column (causing the data to be clipped).

In some example embodiments, the formula used to calculate the column width can be expressed with the following formula: max(min(headerWidth, maxColumnWidth), minColumnWidth). The maxColumnWidth may be derived from the type of data in the column (also known as the cctsType), but in many cases could simply be set to infinity, which caps each column width at the widest width of the data in the body of the column. The minColumnWidth may be defined as discrete pixel value, wide enough to provide a "hit box" for finger or cursor access to the column header for dragging or double clicking it.

Furthermore, while the width of a column may not be allowed to be reduced to calculated through the operations of FIG. 3 below the width of the widest data in the body of the column, in some example embodiments it is permissible to reduce the width of the header of the column below the width of the widest data in the body of the column. In the easy case, this may involve a multiple word header having some of its words in one line and some of its word on another line, such as the header "purchase date" being split so that "purchase" is on a first line and "date" is on a second line. This, of course, assumes that such a modification would be necessary, which it wouldn't be if the data in the "purchase date" column has at least one cell that has a width larger than the width of the original header "purchase date."

In the more complex case, one of the words in the header may be split into two parts and a hyphen added to the first part, with the first part displayed on a first line and the second part displayed on a second line. This may only be possible for what is termed as "legal word breaks," namely word breaks that the web browser or other application permits to occur. In some example embodiment, a fallback may be used if it is not possible to split one of the words in the header into two parts and use a hyphen due to it being an illegal word break. This fallback involves reducing the width of the column, including the header, anyway and using ellipses to depict that a word in the header is not completely displayed. This technique can actually be used if the hyphenation fails for any reason. The rest of the word that is hidden by the reduction of the column width and represented by the ellipses can optionally be shown to the user upon a "mouseover" event with respect to the ellipses, wherein if the user hovers a pointer over the ellipses or otherwise engages in a navigation action related to obtaining more information about the ellipses, a separate window overlaid over the user interface in the vicinity of the ellipses that displays the entirety of the hidden word or words. This is sometimes called a "tooltip."

If it is determined at operation 310 that the sum is exactly the same width of the container in which the table is intended to be rendered (obtained in operation 304), then no action need be taken.

At operation 316, the container, with the corresponding table, may be rendered using the column widths determined by the previous operations in FIG. 3. There are additional optional operations that can be performed at this point once the initial table has been rendered. Specifically, the user is able to override one or more of the column widths in various ways through user interface interaction with the container. At operation 318, it is determined if the user double-clicks or otherwise selects a header cell border of a first column. If so, then at operation 320, it is determined if the first column is narrower than the largest width of the data in the body of the first column or narrower than the header text width, and the sum of the widths of the columns is still wider than the container. If so, then at operation 322, the column width for the first column is placed in an "override" state and increased to the full width of the header text width. At this point, the method 300 returns to operation 310 so that the other column widths can be adjusted. If, at operation 320, it is determined that the column width is wider than the largest width of the data in the body of the first column and wider than the header text width of the first column, then at operation 324 the column width of the first column is placed in an "override" state and decreased to the size of the widest data in the body of first column. Then, at this point the method 300 returns to operation 310 so that the other column widths can be adjusted. If, at operation 320, it is determined that the column width is equally as wide as the greater of the header text width and the width of the widest data in the body of the first column, then at operation 326, the first column is removed from the override state and the method 300 returns to operation 310 so that all the column widths can be adjusted, essentially returning the column width of the first column to the state it was before any manually overriding was performed by the user.

As described briefly earlier, a dynamically adjusted table may be readjusted when the screen display is changed or pivoted (e.g., from landscape to portrait, or vice-versa). Recalculating all the variables described and used in FIG. 3, however, can be computationally expensive. As such, if, at operation 328 a pivot or other screen change is detected, then rather than repeating the entire FIG. 3, including the computation of the minimum widths for each column, the method 300 returns to 310, while reusing the minimum widths for each column and the sum of these minimum widths as computed previously in FIG. 3. This reduces computational complexity.

What follows is a series of before and after screen captures illustrating the dynamic adjusting of tables in accordance with an example embodiment. It should be noted that the "before" cases are hypothetical screen captures for tables. This is because, as described earlier, in an example embodiment the processes of dynamic adjusting of the tables are performed prior to the table being displayed. Thus, the tables depicted in the "before" cases below are representations of the state of the table prior to being displayed, but these states are not displayed as the "after" cases are the result of the dynamic adjustment that occurs prior to display.

FIGS. 4A-4B are screen captures illustrating the dynamic adjustment of a table 400 by removal of a column 402. Specifically, as described in operation 302 above, any blank columns may be removed from the table. FIG. 4A depicts the "before" case, where column 402 exists and is completely blank. As such, this column 402 may be removed in the "after" case, which is depicted in FIG. 4B. Additionally, as described in operation 312, here the sum of all the largest widths of all the columns is found to be less than or equal to the width of the container, and thus there is no need for a horizontal scroll bar. Additionally the columns may be expanded beyond the initial width set earlier to make the columns take up substantially or completely the entire available width of the display (without the need to render a horizontal scroll bar). For example, the width of column 404 is expanded so that the entire contents of the cells 406A-406D are visible, rather than being cut-off.

FIG. 5A-5B are screen captures illustrating the dynamic adjustment of a table 500 by reducing the width of some columns while increasing the width of other columns, in accordance with an example embodiment. FIG. 5A depicts the "before" case, where column 502 has a width that is narrower than its widest data in the body (thus cutting off a portion of cells 504A-504D), while columns 506, 508, 510, and 512 have widths that is wider than the widest data in the body. As such column 502 is widened and columns 506, 508, 510, and 512 are narrowed in the "after" case, which is depicted in FIG. 5B. Thus, horizontal scroll bar 514 may be removed.

FIG. 6A-6B are screen captures illustrating the dynamic adjustment of a table 600 by reducing the width of some columns and wrapping header text, in accordance with an example embodiment. FIG. 6A depicts the "before" case, where a horizontal scroll bar 602, at least partially because certain columns 604, 606 are wider than their largest corresponding data in the body and also larger than their headers need to be. As such, among other changes to the table 600, columns 604 and 606 are reduced in widths and their headers wrapped to make the table 600 be capable of rendering without the horizontal scroll bar 602 in the "after" case, which is depicted in FIG. 6B.

In an example embodiment, the dynamic adjustment of the width of columns is performed by modifying the elements for the header and the body of columns in the Document Object Model (DOM) for the corresponding web page, in cases where the solution is implemented in browser-based technology. Specifically, in some example embodiments, a style tag is injected with specialized Cascade Style Sheet (CSS) definitions, with one CSS rule for each cell in every row.

In some example embodiments, the minimum widths may be calculated based on machine learning techniques, using training data from the particular user viewing the table and/or other users who have viewed similar tables in the past. For example, a machine learning algorithm can be used to train a machine learned model that would learn that certain types of users select on date columns that have at least 3 white spaces of padding than date columns than have fewer than 3 white spaces of padding. This information may then be used to calculate the minimum width of a date column at the maximum width of the data in the column plus 3 white spaces of padding.

The machine-learning algorithm may be selected from among many different potential supervised machine-learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models.

EXAMPLES

Example 1. A system comprising:
at least one hardware processor; and
a computer-readable medium storing instructions that, when executed by the at least one hardware processor, cause the at least one hardware processor to perform operations comprising:
obtaining a container data structure, the container data structure including a table comprising a plurality of cells organized into columns and rows, each column having a column width, a header cell, and a plurality of data cells;
determining a width for the container data structure;
scanning the table to determine, for each column, a maximum width of data in the plurality of data cells in the column;
computing a sum of the determined maximum widths of the columns in the table;
comparing the sum to the width of the container data structure; and
in response to a determination that the sum is greater than the width of the container data structure, reducing the width of one or more columns of the table to no less than the maximum width for each column.

Example 2. The system of Example 1, wherein the operations further comprise removing any blank columns.

Example 3. The system of either of Examples 1 or 2, wherein the sum includes, for each column, a padding number of spaces.

Example 4. The system of any of Examples 1-3, wherein the operations further comprise, in response to a determination the sum is less than the width of the container data structure, increasing the width of one or more columns of the table without increasing the width so much that it increases the sum to be larger than the width of the container data structure.

Example 5. The system of any of Examples 1-4, wherein the reducing the width includes, for at least one column, reducing the width to be less than a width of text in the corresponding header cell.

Example 6. The system of Example 5, wherein the text in the corresponding header cell is split into multiple rows.

Example 7. The system of Example 6, wherein at least one word in the corresponding header cell is split into multiple word fragments and a hyphen added.

Example 8. A method comprising:
obtaining a container data structure, the container data structure including a table comprising a plurality of cells organized into columns and rows, each column having a column width, a header cell, and a plurality of data cells;
determining a width for the container data structure;
scanning the table to determine, for each column, a maximum width of data in the plurality of data cells in the column;
computing a sum of the determined maximum widths of the columns in the table;
comparing the sum to the width of the container data structure; and in response to a determination that the sum is greater than the width of the container data structure, reducing the width of one or more columns of the table to no less than the maximum width for each column.

Example 9. The method of Example 8, further comprising removing any blank columns.

Example 10. The method of either of Examples 8 or 9, wherein the sum includes, for each column, a padding number of spaces.

Example 11. The method of any of Examples 8-10, further comprising, in response to a determination the sum is less than the width of the container data structure, increasing the width of one or more columns of the table without increasing the width so much that it increases the sum to be larger than the width of the container data structure.

Example 12. The method of any of Examples 8-11, wherein the reducing the width includes, for at least one column, reducing the width to be less than a width of text in the corresponding header cell.

Example 13. The method of Example 12, wherein the text in the corresponding header cell is split into multiple rows.

Example 14. The method of Example 13, wherein at least one word in the corresponding header cell is split into multiple word fragments and a hyphen added.

Example 15. A non-transitory machine-readable medium storing instructions which, when executed by one or more processors, cause the one or more processors to perform operations comprising:
- obtaining a container data structure, the container data structure including a table comprising a plurality of cells organized into columns and rows, each column having a column width, a header cell, and a plurality of data cells;
- determining a width for the container data structure;
- scanning the table to determine, for each column, a maximum width of data in the plurality of data cells in the column;
- computing a sum of the determined maximum widths of the columns in the table;
- comparing the sum to the width of the container data structure; and in response to a determination that the sum is greater than the width of the container data structure, reducing the width of one or more columns of the table to no less than the maximum width for each column.

Example 16. The non-transitory machine-readable medium of Example 15, wherein the operations further comprise removing any blank columns.

Example 17. The non-transitory machine-readable medium of either of Examples 15 or 16, wherein the sum includes, for each column, a padding number of spaces.

Example 18. The non-transitory machine-readable medium of any of Examples 15-17, wherein the operations further comprise, in response to a determination the sum is less than the width of the container data structure, increasing the width of one or more columns of the table without increasing the width so much that it increases the sum to be larger than the width of the container data structure.

Example 19. The non-transitory machine-readable medium of any of Examples claim 15-18, wherein the reducing the width includes, for at least one column, reducing the width to be less than a width of text in the corresponding header cell.

Example 20. The non-transitory machine-readable medium of Example 19, wherein the text in the corresponding header cell is split into multiple rows.

Figure 7:
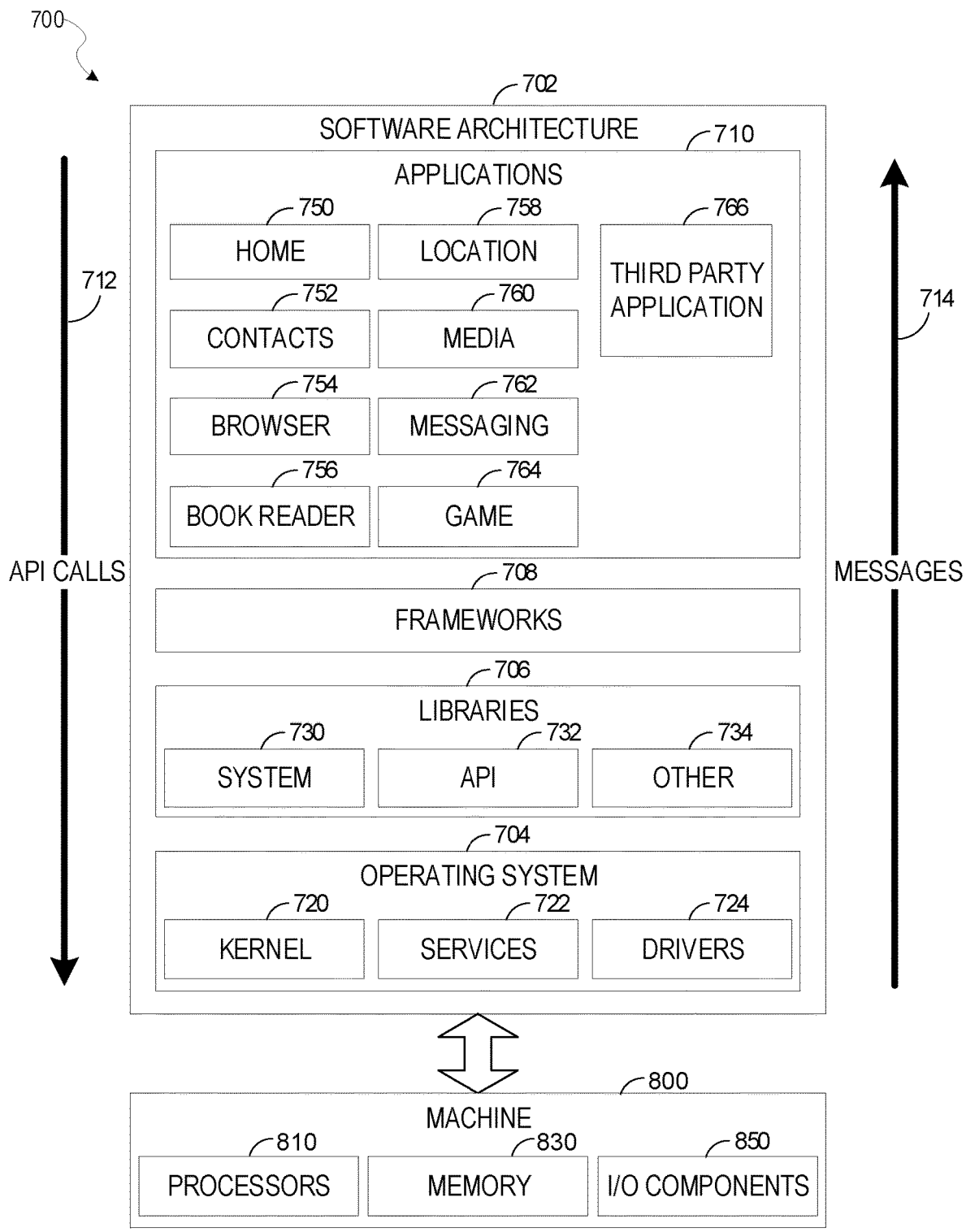
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
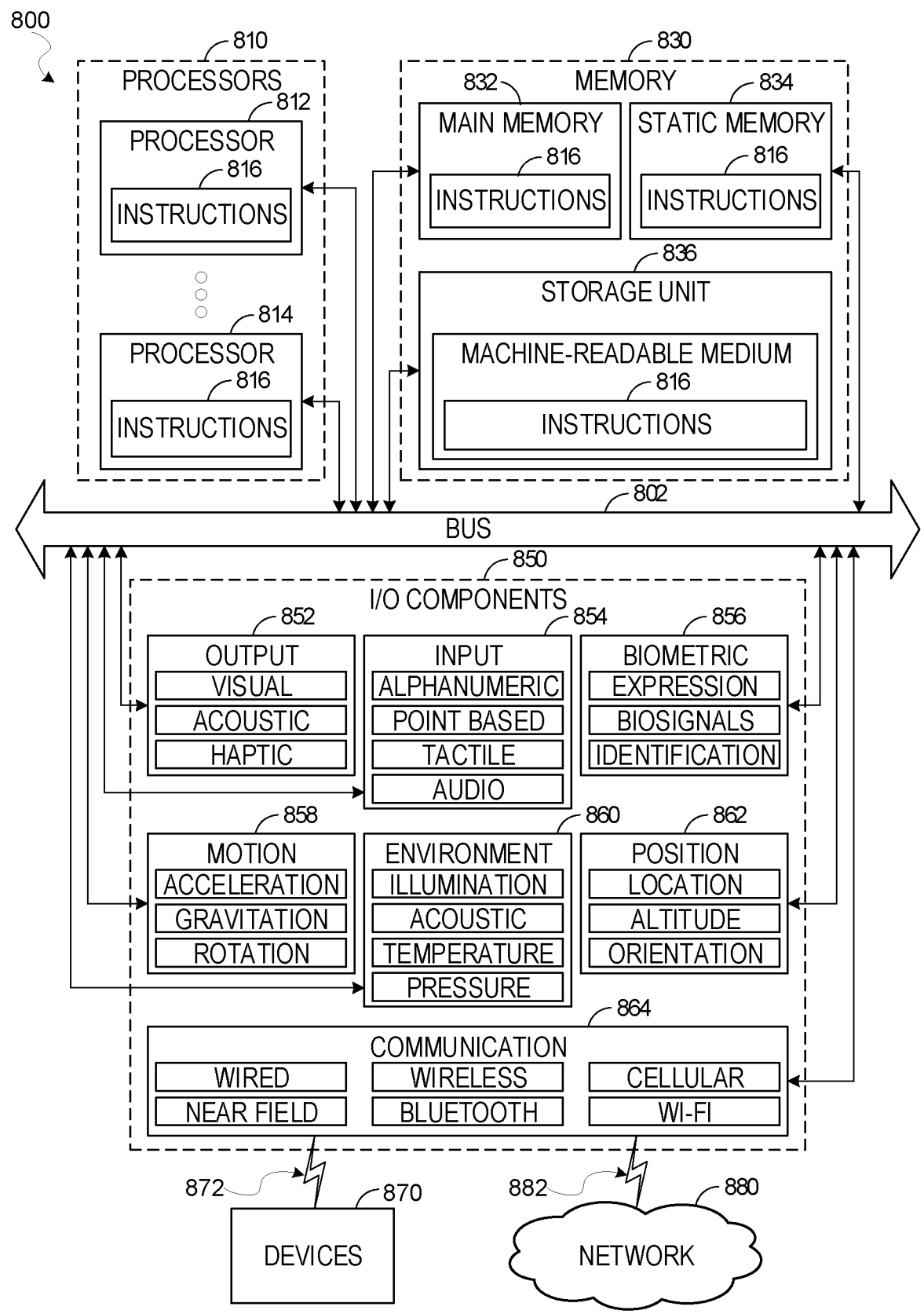
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 300 of FIG. 3. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method comprising:
   obtaining a container data structure, the container data structure including a table comprising a plurality of cells organized into columns and rows, each column having a column width, a header cell, and a plurality of data cells;

determining a width for the container data structure;
scanning the table to determine, for each column, a maximum width of data in the plurality of data cells in the column;
computing a sum of the determined maximum widths of the columns in the table;
comparing the sum to the width of the container data structure; and
dependent upon the comparing, reducing the width of one or more columns of the table that are not blank to no less than the maximum width for the data within data cells within each column, but also to less than a width of text in a corresponding header cell.

2. The method of claim 1, further comprising removing any blank columns.

3. The method of claim 1, wherein the sum includes, for each column, a padding number of spaces.

4. The method of claim 1, further comprising, in response to a determination the sum is less than the width of the container data structure, increasing the column width of one or more columns of the table without increasing the column width of the one or more columns so that it increases the sum to be larger than the width of the container data structure.

5. The method of claim 1, wherein the text in the header cell of at least one column is split into multiple rows.

6. The method of claim 5, wherein at least one word in the corresponding header cell is split into multiple word fragments and a hyphen added.

7. A system comprising:
at least one hardware processor; and
a computer-readable medium storing instructions that, when executed by the at least one hardware processor, cause the at least one hardware processor to perform operations comprising:
obtaining a container data structure, the container data structure including a table comprising a plurality of cells organized into columns and rows, each column having a column width, a header cell, and a plurality of data cells;
determining a width for the container data structure;
scanning the table to determine, for each column, a maximum width of data in the plurality of data cells in the column;
computing a sum of the determined maximum widths of the columns in the table;
comparing the sum to the width of the container data structure; and
dependent upon the comparing, reducing the width of one or more columns of the table that are not blank to no less than the maximum width for the data within data cells within each column, but also to less than a width of text in a corresponding header cell.

8. The system of claim 7, wherein the operations further comprise removing any blank columns.

9. The system of claim 7, wherein the sum includes, for each column, a padding number of spaces.

10. The system of claim 7, wherein the operations further comprise, in response to a determination the sum is less than the width of the container data structure, increasing the column width of one or more columns of the table without increasing the column width of the one or more columns so that it increases the sum to be larger than the width of the container data structure.

11. The system of claim 7, wherein the text in the header cell of at least one column is split into multiple rows.

12. The system of claim 11, wherein at least one word in the corresponding header cell is split into multiple word fragments and a hyphen added.

13. The system of claim 7, wherein a column is not blank if it has data in any of its cells.

14. A non-transitory machine-readable medium storing instructions which, when executed by one or more processors, cause the one or more processors to perform operations comprising:
obtaining a container data structure, the container data structure including a table comprising a plurality of cells organized into columns and rows, each column having a column width, a header cell, and a plurality of data cells;
determining a width for the container data structure;
scanning the table to determine, for each column, a maximum width of data in the plurality of data cells in the column;
computing a sum of the determined maximum widths of the columns in the table;
comparing the sum to the width of the container data structure; and
dependent upon the comparing, reducing the width of one or more columns of the table that are not blank to no less than the maximum width for the data within data cells within each column, but also to less than a width of text in a corresponding header cell.

15. The non-transitory machine-readable medium of claim 14, wherein the operations further comprise removing any blank columns.

16. The non-transitory machine-readable medium of claim 14, wherein the sum includes, for each column, a padding number of spaces.

17. The non-transitory machine-readable medium of claim 14, wherein the operations further comprise, in response to a determination the sum is less than the column width of the container data structure, increasing the column width of one or more columns of the table without increasing the width of the one or more columns so that it increases the sum to be larger than the width of the container data structure.

18. The non-transitory machine-readable medium of claim 14, wherein the text in the corresponding header cell is split into multiple rows.

19. The non-transitory machine-readable medium of claim 14, wherein the text in the header cell of at least one column is split into multiple rows.

20. The non-transitory machine-readable medium of claim 19, wherein at least one word in the corresponding header cell is split into multiple word fragments and a hyphen added.

* * * * *